United States Patent
Wadsworth et al.

(10) Patent No.: US 7,433,430 B2
(45) Date of Patent: *Oct. 7, 2008

(54) WIRELESS COMMUNICATIONS DEVICE PROVIDING ENHANCED BLOCK EQUALIZATION AND RELATED METHODS

(75) Inventors: Michael Andrew Wadsworth, Palmyra, NY (US); John Wesley Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 688 days.

This patent is subject to a terminal disclaimer.

(21) Appl. No.: 11/054,158

(22) Filed: Feb. 9, 2005

(65) Prior Publication Data

US 2006/0176983 A1 Aug. 10, 2006

(51) Int. Cl.
*H03D 1/00* (2006.01)
(52) U.S. Cl. .............. 375/343; 375/152; 375/295; 375/373; 375/147; 370/335; 370/320; 327/244; 327/141; 327/294
(58) Field of Classification Search ............ 375/233, 375/340, 148, 147, 350, 343, 152, 295, 373; 327/244, 141, 294
See application file for complete search history.

(56) References Cited

U.S. PATENT DOCUMENTS

| 5,706,314 | A | | 1/1998 | Davis et al. ........ 375/340 |
| 5,790,598 | A | * | 8/1998 | Moreland et al. ....... 375/233 |
| 6,393,073 | B1 | | 5/2002 | Eilts ................. 375/340 |
| 6,707,864 | B2 | * | 3/2004 | Kim ................. 375/343 |
| 6,763,064 | B1 | * | 7/2004 | Graf et al. ........... 375/230 |
| 7,295,596 | B2 | * | 11/2007 | Misra et al. .......... 375/147 |
| 2002/0122508 | A1 | | 9/2002 | Jard et al. ............ 375/340 |
| 2004/0076248 | A1 | * | 4/2004 | Purho ................ 375/350 |
| 2005/0152295 | A1 | * | 7/2005 | Reznik .............. 370/310 |
| 2005/0153663 | A1 | | 7/2005 | Pan et al. ............. 455/78 |
| 2005/0271165 | A1 | | 12/2005 | Geraniotis et al. ..... 375/340 |
| 2006/0120439 | A1 | | 6/2006 | Smee et al. ........... 375/148 |

OTHER PUBLICATIONS

Hwang et al., *A Novel Block Equalization Design for Wireless Communication with ISI and Rayleigh Fading Channels*, presented at ASIA-Pacific Conference on ASISs, Aug. 6-8, 2002.
Kung, *Why Systolic Architectures?*, The Institute of Electrical and Electronics Engineers, Inc., pp. 72-81, 1982.

* cited by examiner

*Primary Examiner*—Chieh M. Fan
*Assistant Examiner*—Eva Puente
(74) *Attorney, Agent, or Firm*—Allen, Dyer, Doppelt, Milbrath & Gilchrist

(57) ABSTRACT

A wireless communications device may include a wireless receiver receiving signals having alternating known and unknown symbol portions over a channel, and a demodulator systolic array. The demodulator systolic array may include a channel estimation module generating respective channel estimates for each unknown symbol portion based upon the known symbol portions. An autocorrelation module may generate autocorrelation matrices based upon the channel estimates. A channel match filter module may generate respective channel matching coefficients for the unknown symbol portions, and a factorization module may divide the autocorrelation matrices into respective upper and lower autocorrelation matrices. A transformation module may transform the channel matching coefficients into upper and lower channel matching coefficients. A back-substitution module may determine the unknown symbol portions by estimating the unknown symbol portions based upon autocorrelation matrices and channel matching coefficients, lower autocorrelation matrices and channel matching coefficients, and combining the estimates.

30 Claims, 9 Drawing Sheets

WIRELESS COMMUNICATIONS DEVICE PROVIDING ENHANCED BLOCK EQUALIZATION AND RELATED METHODS

FIELD OF THE INVENTION

The present invention relates to the field of wireless communications systems, and, more particularly, to wireless communications devices employing block-based channel equalization and related methods.

BACKGROUND OF THE INVENTION

High frequency (HF) radio channels, very-high frequency (VHF) radio channels and ultra-high frequency (UHF) radio channels all exhibit time and frequency dispersion (i.e., delay spread and Doppler spread) due to the presence of signal reflectors or scatterers in the environment, as well as the relative motion of transmitters and receivers. As a result, the channel experiences distortion which can cause transmitted symbols to be incorrectly interpreted at the receiving device. Doppler spreading can cause the delay spread (i.e., multipath) to vary with time. These phenomena typically require modems to employ equalization to track and compensate for the time-varying multipath channel.

Two general approaches for channel equalization are commonly used. The first is symbol-based equalization, where equalizer coefficients are maintained and updated for each symbol. The second approach is block equalization, in which the equalizer coefficients are instead maintained and updated for blocks of unknown data symbols, rather than individual symbols. In an article entitled "A Novel Block Equalization Design for Wireless Communication with ISI and Rayleigh Fading Channels" by Hwang et al., the authors note that a drawback of symbol based equalization is that it requires considerable computing overheads for updating the coefficients on a symbol-by-symbol basis. On the other hand, Hwang et al. point out that while block equalization may result in a significant decrease in complexity for performing coefficient updates, this approach requires some knowledge of the channel, which generally requires channel estimation.

The design proposed by Hwang et al. includes a matched filter, a channel estimator, and a block decision feedback equalizer (BDFE). The channel estimator, which is based on a revised recursive least squares (RLS) algorithm, adopts a "semi-blind" approach, in which an estimated channel impulse response h(n) is used later in both matched filtering and the BDFE update. The BDFE includes a noise whitener and a maximum-likelihood block detector followed by a symbol detector. The filter coefficients of the BDFE are calculated subject to the Cholesky factorization and are updated once for each data block. Hwang et al. implement the BDFE design as a systolic array on a field programmable gate array (FPGA).

Another approach to combat multipath can be found in the wideband networking waveform (WNW) which uses orthogonal frequency division multiplexing (OFDM). The WNW approach is based upon non-coherent parallel tone modem technology, and it does not use an equalizer but instead uses a guard time and forward error correction (FEC) to cope with delay spread/frequency selective fading. While this approach is fairly straightforward, it may not provide desired performance when faced with significant fading and interference, and it may also result in relatively high peak-to-average ratios in some circumstances.

Still another approach has been developed by Trellis Ware and ITT of San Diego, Calif., which utilizes 1.2 MHz bandwidth continuous phase modulation (CPM) with serial concatenated convolutional code, and a reduced state maximum likelihood sequence estimator (MLSE) equalizer. While this approach may have certain advantages, it requires significant complexity (especially for wider bandwidths). Also, relatively high bits/Hz ratios may not be achievable in certain applications.

Despite the advantages of the above-noted approaches, other block equalization techniques may be desirable for use with relatively wideband waveforms to provide high data rates despite multi-path and fading channel conditions.

SUMMARY OF THE INVENTION

In view of the foregoing background, it is therefore an object of the present invention to provide a wireless communications device which provides enhanced block equalization and related methods.

This and other objects, features, and advantages in accordance with the present invention are provided by a wireless communications device which may include a wireless receiver for receiving wireless signals having alternating known and unknown symbol portions over a channel, and a demodulator systolic array connected to the wireless receiver for performing block equalization operation. More particularly, the demodulator systolic array may include a channel estimation module for generating respective channel estimates for each unknown symbol portion based upon the known symbol portions, an autocorrelation module for generating autocorrelation matrices based upon the channel estimates, and a channel-matched filter module for generating respective channel matching coefficients for the unknown symbol portions.

The demodulator systolic array may further include a factorization module for dividing the autocorrelation matrices into respective upper and lower autocorrelation matrices, and a transformation module for transforming the channel matching coefficients into upper and lower channel matching coefficients. A back-substitution module may determine the unknown symbol portions by estimating the unknown symbol portions based upon respective upper autocorrelation matrices and upper channel matching coefficients (i.e., using a "top-down" approach), estimating the unknown symbol portions based upon respective lower autocorrelation matrices and lower channel matching coefficients (i.e., a "bottom-up" approach), and combining the estimates to determine the symbols for each unknown symbol portion. More particularly, the combination may be an average of the estimates.

The autocorrelation module may generate the autocorrelation matrices based upon the channel estimates and a noise variance associated with the channel. The demodulator systolic array may also include a signal energy removal module for removing a known signal energy quantity from the unknown channel-matched filtered symbol portions.

The factorization module may determine the upper and lower channel matching coefficients based upon various techniques depending on the symmetry of the autocorrelation array, such as Gaussian elimination (e.g., when channel estimate is not constant across unknown frame), Cholesky, Bareiss, Levinson, or Schur factorization (e.g., when channel estimate is constant across frame), to name a few. Moreover, the demodulator systolic array may be implemented in a variety of devices, such as a field-programmable gate array (FPGA) or an application specific integrated circuit (ASIC), for example.

A wireless communications method aspect of the invention may include receiving wireless signals comprising alternating known and unknown symbol portions over a channel, generating respective channel estimates for each unknown symbol portion based upon the known symbol portions and generating autocorrelation matrices based upon the channel estimates. The method may further include generating respective channel matching coefficients for the unknown symbol portions, dividing the autocorrelation matrices into respective upper and lower autocorrelation matrices, and transforming the channel matching coefficients into upper and lower channel matching coefficients. Further, the unknown symbol portions may be determined by estimating the unknown symbol portions based upon respective upper autocorrelation matrices and upper channel matching coefficients (i.e., using a "top-down" approach), estimating the unknown symbol portions based upon respective lower autocorrelation matrices and lower channel matching coefficients (i.e., a "bottom-up" approach), and combining the estimates to determine the symbols for each unknown symbol portion.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

The present invention is applicable to communication systems in general, but it is particularly concerned with communication systems which insert known sequences in a transmit (TX) waveform to track multi-path and/or fading communication channels (e.g., wireless communications, telephone lines, etc.), and to equalize the received (RX) waveform to remove the effects of the multi-path (i.e., inter-symbol interference (ISI)) from the received signal. The insertion of known sequences in the TX waveform allows for channel estimation and block equalization. This invention is applicable to high frequency (HF), very high frequency (VHF), ultra high frequency (UHF) and other wireless communication systems which have been designed to work under difficult multi-path and fading conditions, for example.

Figure 2:
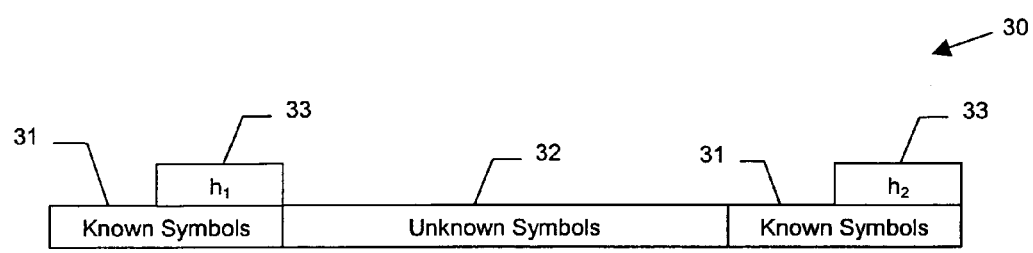
FIG. 2 is a schematic block diagram of a prior art signal waveform having alternating known and unknown symbol portions to be demodulated using block equalization.

When known sequences are inserted in a TX waveform, the receive waveform may take the form of the received signal 30 shown in FIG. 2. The actual TX waveform includes an initial synchronization preamble portion 31, which is a set of known symbols (PK), followed by unknown data symbol (Un) portions 32, followed by another known symbol portion (K), etc., until the end of the transmission (i.e. Pk Un K Un K Un K . . . Un K). This type of K-Un-K framing allows for the use of block equalization strategies in the receiver. Block equalizers have been found to provide very good performance on multi-path fading channels, as will be appreciated by those skilled in the art. In the illustrated example, the last half of the known symbols are used to compute channel estimates 33 ($h_1$ and $h_2$) on both sides of the unknown data symbols. If longer channel estimates are required, the length of channel estimate can be as long as the known symbols, but additional processing may be required to arrive at a channel estimate.

The mathematical operations (and associated equations) performed in accordance with the present invention will first be described, and the hardware/software used for implementing these operations will be described thereafter with reference to the equations for clarity of understanding. When a digital waveform encounters a multi-path fading channel, the output can be represented by the following equation:

$$y_i = \sum_{j=0}^{L-1} h_j x_{i-j} + n_i. \quad (1)$$

The variable x represents samples of the original transmitted symbols (i.e., K, Un, K), h is the combination of the multi-path/fading channel and any other filters in TX/RX radio equipment and is of length L (for current time i), n is additive white Gaussian noise (AWGN) samples, and y is the received samples. For the purpose of describing this invention, the channel and channel estimate are assumed to be constant across the unknown frame, but this invention may also deal with interpolated channel estimates across the unknown symbol frame (i.e., a time varying-channel).

If we channel-match filter the received waveform, the output of the system becomes:

$$b_i = \sum_{j=0}^{L-1} h_{-j}^* y_{j-i}. \quad (2)$$

The symbol * stands for complex conjugate operator. Letting L=4, K=8, U=8, and expanding the above equation into matrix form, $$\begin{bmatrix} b_0 \\ b_1 \\ b_2 \\ b_3 \\ b_4 \\ b_5 \\ b_6 \\ b_7 \end{bmatrix} = \begin{bmatrix} R_0 & R_1 & R_2 & R_3 & 0 & 0 & 0 & 0 \\ R_{-1} & R_0 & R_1 & R_2 & R_3 & 0 & 0 & 0 \\ R_{-2} & R_{-1} & R_0 & R_1 & R_2 & R_3 & 0 & 0 \\ R_{-3} & R_{-2} & R_{-1} & R_0 & R_1 & R_2 & R_3 & 0 \\ 0 & R_{-3} & R_{-2} & R_{-1} & R_0 & R_1 & R_2 & R_3 \\ 0 & 0 & R_{-3} & R_{-2} & R_{-1} & R_0 & R_1 & R_2 \\ 0 & 0 & 0 & R_{-3} & R_{-2} & R_{-1} & R_0 & R_1 \\ 0 & 0 & 0 & 0 & R_{-3} & R_{-2} & R_{-1} & R_0 \end{bmatrix} \begin{bmatrix} x_0 \\ x_1 \\ x_2 \\ x_3 \\ x_4 \\ x_5 \\ x_6 \\ x_7 \end{bmatrix} \quad (3)$$

-continued where:

$$R_i = \sum_{j=0}^{L-1} h_j h_{i-j}^*.$$

It will be noted that the previous matrix equation only involves the Un symbols (i.e., variable $x_i$ in matrix). The effects of the known symbols (K) on both sides have already been removed. It should also be noted that $R_{-i}=R_i^*$, and that the matrix R is known as the channel autocorrelation matrix. Also, this matrix is banded (i.e., zeros on upper right hand and lower left hand of the matrix because the channel is only L taps long). Re-writing the above-noted matrix equation in compressed form and flipping sides provides the following:

$$\overline{R}x=b, \quad (4)$$

where over-lined letters represent matrixes and the remaining quantities are vectors.

The goal of a block equalizer is to solve for the vector x and determine the best estimate of the Un symbols. There are several different approaches to solve for x such as Gaussian elimination, Cholesky, Bareiss, Levinson, Schur and other LU factorization techniques based on whether symmetry exists or does not exist in the $\overline{R}$ matrix (i.e., Gaussian Elimination if no symmetry due to interpolating the channel estimates across Un frame creating a time-varying auto-correlation matrix, Cholesky if Hermitian Symmetry, Bareiss or Levinson if Toeplitz). Also, some iterative techniques can be used to solve for x. An $\overline{LU}$ decomposition transforms $\overline{R}x=b$ into two separate systems of equations, namely:

$$\overline{L}x_l=b_l \text{ and } \overline{U}x_u=b_u,$$

$$b_l=\overline{B}_l b \text{ and } b_u=\overline{B}_u b \quad (5)$$

where $\overline{L}$ is a lower triangular matrix and $\overline{U}$ is an upper triangular matrix, and $b_l$ and $b_u$ are the lower and upper channel matching coefficients that result from the application of the transformation coefficients $\overline{B}_u$ and $\overline{B}_l$ to b in order to maintain equivalence of original equation (4) (i.e., after left hand side of equation has been transformed into a lower diagonal or upper diagonal matrix, b vector (right hand side of equation) must also be transformed into appropriate new channel matching coefficients $b_l$ and $b_u$. In accordance with the present invention, the vector x is solved for by performing a back-substitution algorithm (BSA) on both systems of equations, and the solution values for x are clamped to closest valid constellation points when the BSA is executed and the un-clamped values are saved for generation of soft information. This approach is significantly more efficient than computing the inverse of $\overline{R}$ and multiplying the equation above by $\overline{R}^{-1}$ to solve for x.

Figure 1:
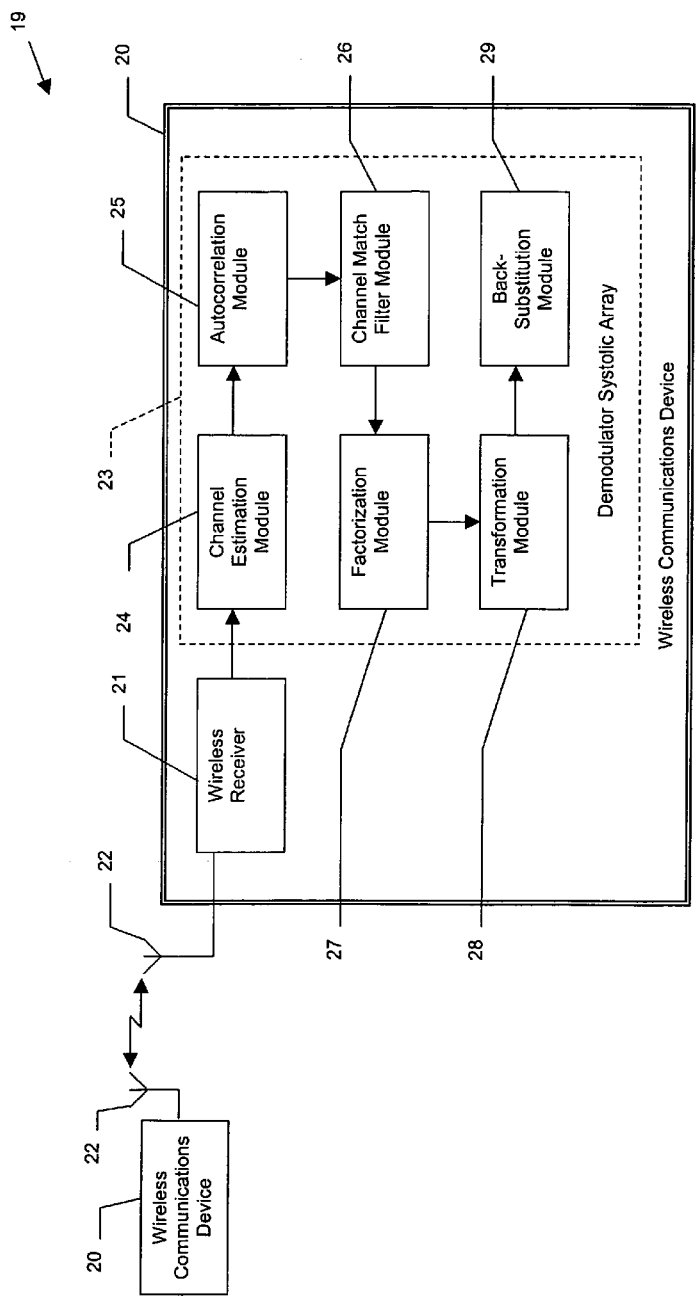
FIG. 1 is a schematic block diagram of a wireless communications system comprising a plurality of wireless communications devices in accordance with the present invention.

Referring initially to FIG. 1, a wireless communications system 19 comprising a plurality of wireless communications devices 20 in accordance with the present invention is now described. Each wireless communications device 20 illustratively includes a wireless receiver 21 and associated antenna 22 for receiving wireless signals 30 having alternating known and unknown symbol portions 31, 32, as discussed above with reference to FIG. 2, over a channel (HF, VHF, UHF, etc.). The device 20 further includes a demodulator systolic array 23 connected to the wireless receiver 21 for performing block equalization on the received wireless signals 30.

The demodulator systolic array 23 illustratively includes a channel estimation module 24 for generating respective channel estimates 33 (i.e., $h_1$ and $h_2$ and/or prior ($h_p$) and future ($h_f$)) for each unknown symbol portion 32 based upon the known symbol portions 31. It should be noted that only one channel estimate $h_2$ or $h_f$ needs to be computed for each (Un, K) frame time, as all other channel estimates may be computed ahead of time and stored for later use. Various channel estimation techniques known in the art may be employed by the channel estimation module 24, such as recursive least square (RLS), least mean square (LMS) estimation, or cyclic correlation, for example.

The next module in the systolic array 23 is an autocorrelation module 25, which generates autocorrelation matrices $\overline{R}$ (see equation 4, above) for each unknown symbol portion 32 based upon the channel estimates 33, as will be appreciated by those skilled in the art. The autocorrelation module 25 may generate the autocorrelation matrices based upon the channel estimates 33, as well as a noise variance associated with the channel. More particularly, the main diagonal of the autocorrelation matrix $\overline{R}$ may be biased based upon the noise variance, which may either be a known quantity for the channel, or it may be determined using various known techniques, as will be appreciated by those skilled in the art.

Moreover, a channel match filter module 26 is included for generating respective channel matching coefficients b (see equation 2) for the unknown symbol portions 32. That is, the channel match filter module 26 performs channel match filtering of y to obtain b, as will be appreciated by those skilled in the art.

The demodulator systolic array 23 also illustratively includes a factorization module 27 for dividing the autocorrelation matrices into respective upper ($\overline{U}$) and lower ($\overline{L}$) triangular autocorrelation matrices using an $\overline{LU}$ decomposition, as noted above. Moreover, a transformation module 28 similarly transforms the channel matching coefficients b into upper and lower channel matching coefficients $b_u$ and $b_l$ (see equation 5, above).

The systolic array 23 further includes a back-substitution module 29 which determines the unknown symbol portions 32 based upon respective upper and lower autocorrelation matrices $\overline{U}$, $\overline{L}$ and upper and lower channel matching coefficients $b_u$, $b_l$. Preferably, the back-substitution module 29 solves for the symbols in a given unknown symbol portion 32 using the upper autocorrelation matrix $\overline{U}$ and upper channel matching coefficients $b_u$, and then using the lower autocorrelation matrix $\overline{L}$ and lower channel matching coefficients $b_l$, and combining (i.e., averaging) the two of course, it should be noted that the order of solving could be reversed if desired (i.e., first solve using $\overline{L}$, $b_l$, and then $\overline{U}$, $b_u$).

The above technique may conceptually be considered as a "top-down" approach when solving using the upper autocorrelation triangular matrix, and a "bottom-up" approach when solving using the lower autocorrelation triangular matrix. By averaging the results of the top-down and bottom-up results, the errors that are induced in the BSA by clamping to the wrong symbol in the decision device (due to noise and/or multipath and fading) are reduced.

The factorization module 27 may implement a variety of techniques for determining the unknown symbol portions. By way of example, such techniques may include Gaussian elimination, Cholesky factorization, Bareiss factorization, and Levinson factorization. As noted above, other iterative techniques may also be used, as will be appreciated by those skilled in the art.

The demodulator systolic array 23 may advantageously be implemented in a variety of devices, such as a field-programmable gate array (FPGA) or an application specific integrated circuit (ASIC), for example. Because of the relative speed available with such devices, the demodulator systolic array 23 is advantageously suitable for use with wideband waveforms with widths of about 5 to 10 MHz, or higher, for example. Moreover, it will be appreciated by those skilled in the art that the demodulator systolic array 23 may advantageously exploit the channel estimate properties (i.e., zeros or banded properties) to provide power savings and/or increased multi-path capability and bandwidth.

It should be noted that the arrows between the modules in the demodulator systolic array 23 are generally meant to indicate the flow of module processing operations, not the data flow path between these modules. That is, in the accompanying schematic block diagrams and flow diagrams, the arrows are meant to generally illustrate the order in which operations may be performed for clarity of explanation. Moreover, it should also be noted that in some embodiments various operations may be performed in different orders or in parallel, instead of the exemplary order illustrated in the drawings. For example, the operations performed by the autocorrelation module 25 and the channel match filter module 26 may be performed in different orders or in parallel.

Figure 3:
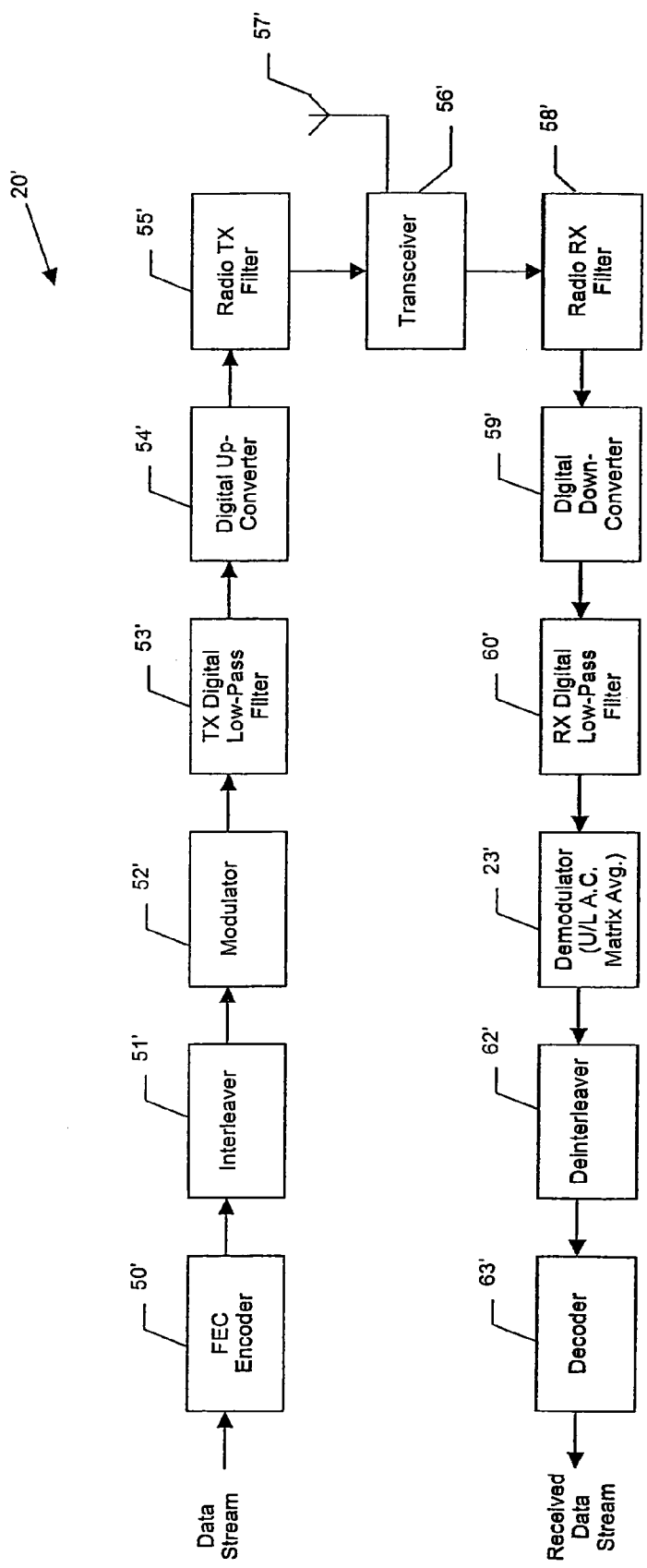
FIG. 3 is schematic block diagram of an embodiment of a wireless communications device of FIG. 1 including both transmission and reception circuitry.

Turning now to FIG. 3, in certain embodiments the wireless communications device 20' will include both transmit and receive components. More particularly, the transmit circuitry illustratively includes a forward error correction (FEC) encoder 50' which receives a data stream to be transmitted, an interleaver 51' downstream from the encoder, a modulator 52' downstream from the interleaver, and a transmit (TX) digital low-pass filter 53' is downstream from the modulator, as will be appreciated by those skilled in the art. Moreover, a digital up-converter 54' is downstream from the transmit digital low-pass filter 53', a radio transmit filter 55' is downstream from the digital up-converter, and a transceiver 56' is downstream from the radio transmit filter for transmitting signals via an associated antenna 57', as will also be appreciated by those skilled in the art.

The wireless communications device 20' may further include additional receiver components illustratively including a radio receive (RX) filter 58' downstream from the transceiver 56', a digital down converter 59' downstream from the radio receive filter, and a receive digital low-pass filter 60' downstream from the digital down converter. The demodulator systolic array 23' is downstream from the receive digital low-pass filter 60', and it is followed by a deinterleaver 62' and then a decoder 63', which reproduces a received data stream. It should be noted that one or more of the above-noted transmit or receive components may also advantageously be implemented on the same FPGA/ASIC as the demodulator systolic array 23', for example. In some embodiments, these components may also be implemented as software modules with a digital signal processor (DSP) as well, as will be appreciated by those skilled in the art.

Figure 4:
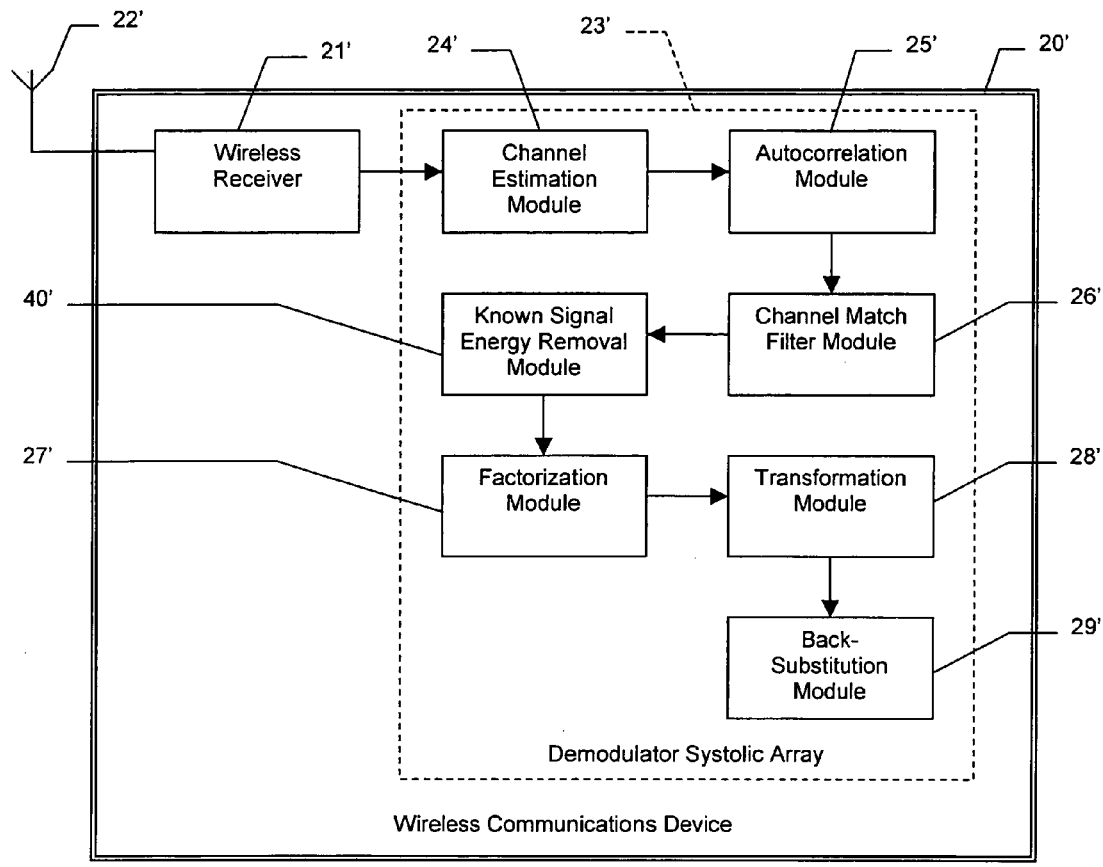
FIG. 4 is a schematic block diagram of an alternate embodiment of a wireless communications device of FIG. 1.

Referring additionally to FIG. 4, in an alternate embodiment of the wireless communications device 20' it may be desirable to include in the demodulator systolic array 23' a signal energy removal module 40' for removing a known signal energy quantity from the unknown symbol portions 32. That is, the known symbol portions 31 may introduce a certain amount of energy into the unknown symbol portions 32, particularly at the beginnings and endings thereof. Since this energy is a known quantity, it may be removed from the channel-matched filtered Un symbols using the autocorrelation coefficients, as will be appreciated by those skilled in the art (i.e., b array would be corrected by known symbols and proper autocorrelation matrix coefficients).

Figure 5:
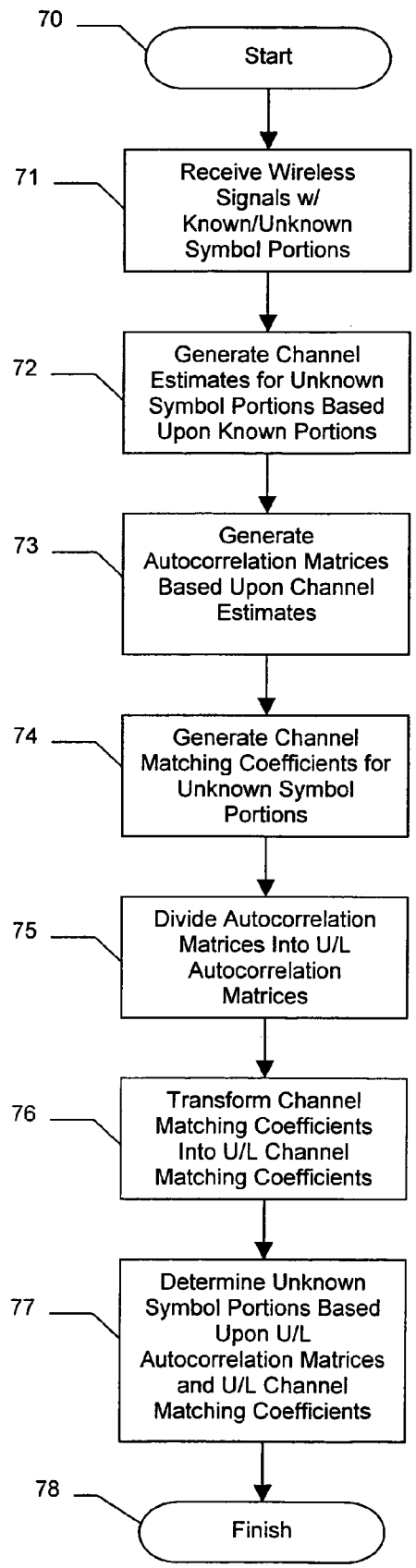
FIGS. 5 and 6 are flow diagrams illustrating the demodulation method steps performed by a wireless communications device of FIG. 1.
Figure 6:
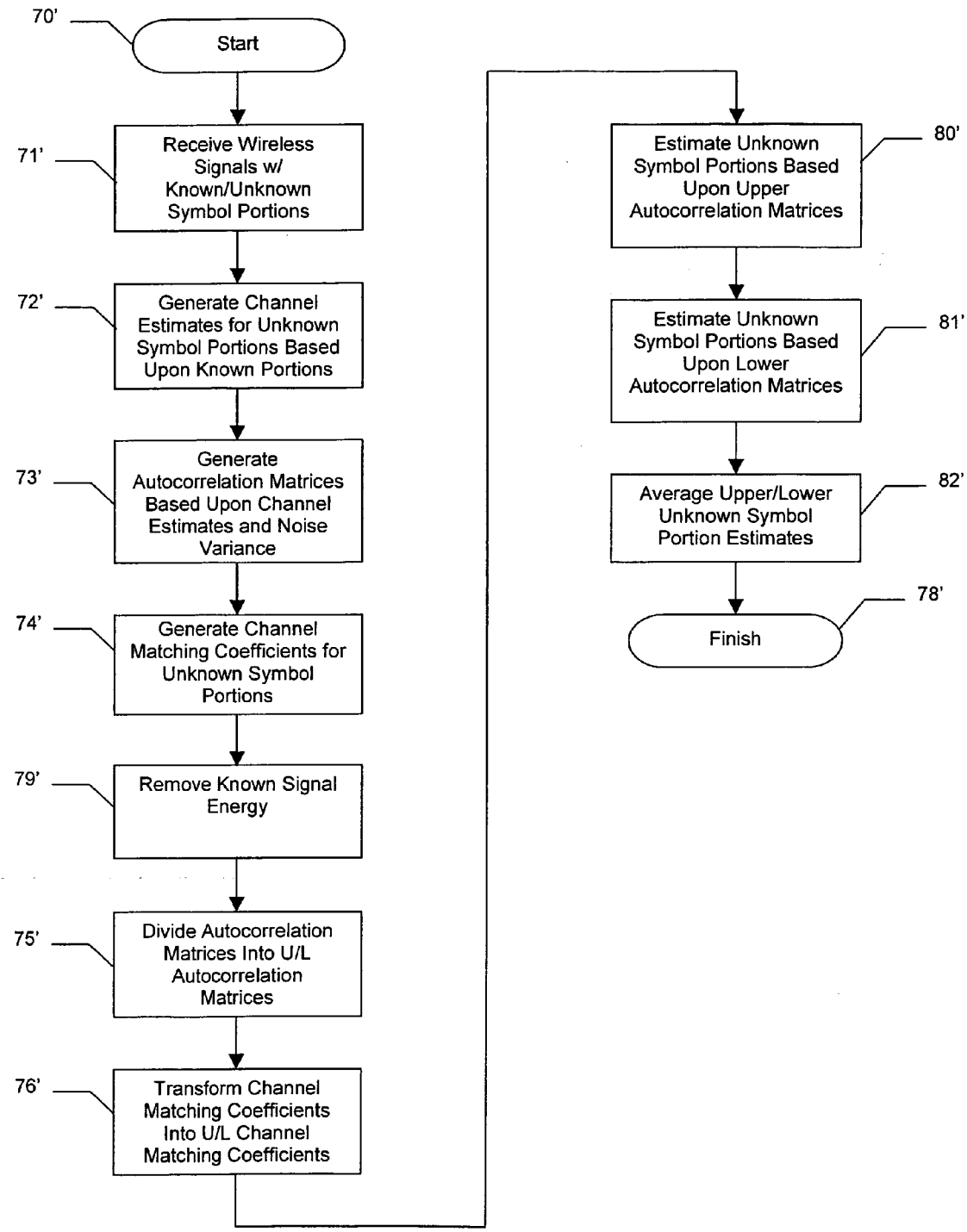

Wireless communications method aspects of the invention are now described with reference to FIGS. 5 and 6. Beginning at Block 70, wireless signals comprising alternating unknown and known symbol portions 32, 31 are received over a channel, at Block 71, and respective channel estimates 33 for each unknown symbol portion are generated based upon the known symbol portions (Block 72). The method further includes generating autocorrelation matrices $\bar{R}$ based upon the channel estimates 33, at Block 73. This may be done based upon a noise variance as well, as illustrated at Block 73' in FIG. 6, as discussed above.

Respective channel matching coefficients b are generated for the unknown symbol portions 32, at Block 74, as discussed above. Further, the autocorrelation matrices $\bar{R}$ are divided into respective upper and lower autocorrelation matrices $\bar{U}, \bar{L}$, at Block 75, and the channel matching coefficients b are also transformed by the upper and lower transformation coefficients $\bar{B}_u, \bar{B}_l$, at Block 76 into $b_u$ and $b_l$. The unknown symbol portions 32 are determined based upon an average of respective upper and lower autocorrelation matrices $\bar{U}, \bar{L}$ and upper and lower channel matching coefficients $b_u, b_l$, at Block 77, thus concluding the illustrated method (Block 78).

The step of determining the unknown symbol portions 32 illustrated at Block 77 may include estimating the unknown symbol portions based upon respective upper autocorrelation matrices $\bar{U}$ and upper channel matching coefficients $b_u$, at Block 80' (FIG. 6), estimating the unknown symbol portions based upon respective lower autocorrelation matrices $\bar{L}$ and lower channel matching coefficients $b_l$, at Block 81', and averaging respective estimates for each unknown symbol portion, at Block 82'. The known signal energy may also be removed from unknown symbol portions 32 if desired, at Block 79'.

Figure 7:
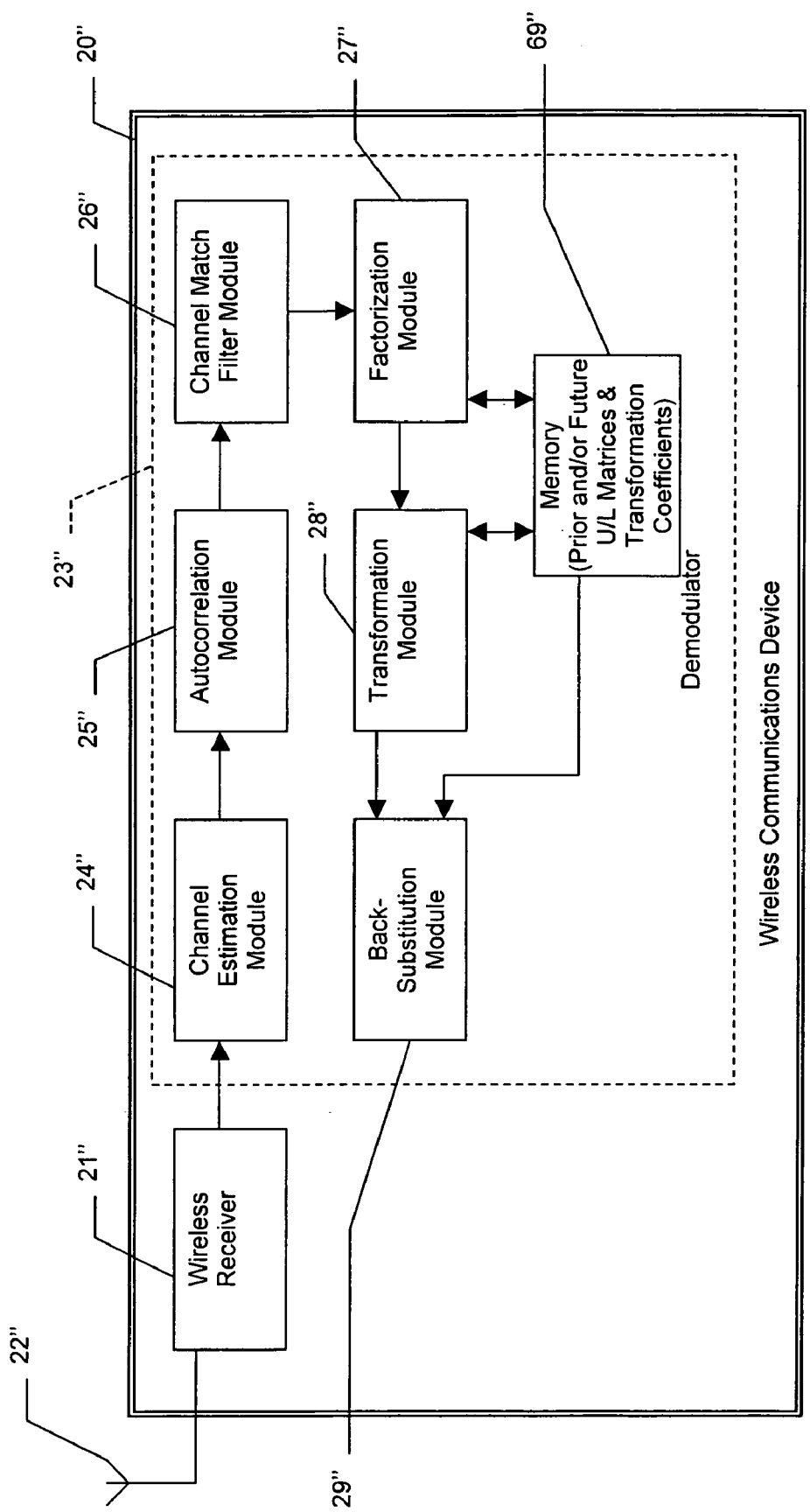
FIG. 7 is a schematic block diagram of another wireless communications device in accordance with the present invention.

Turning now additionally to FIG. 7, an alternate embodiment of the wireless communications device 20" is now described. Generally speaking, to provide increased Doppler spread capability, channel estimates need to be interpolated across a plurality of unknown symbol portions 32. However, this eliminates symmetry in equation 4 noted above, and such loss of symmetry would otherwise require the use of Gaussian elimination to solve. Yet, Gaussian elimination requires a relatively high computational complexity, which may be prohibitive in many applications.

More particularly, when designing waveforms for use on multi-path fading channels, the length of the K symbols is related to the desired multi-path capability of the waveform (usually 2*MAX_MULTI_PATH-1), and the length of the Un symbols is determined by the Doppler spread (rate of fading) of the channel. For example, if we let K be 31 symbols long, we can then compute 16 channel estimate taps. Also, if we let the unknown symbol portion 32 be 256 symbols long, then for a waveform with 2400 symbols per second, channel estimates would be computed approximately once every 120 ms (256+31/2400) which would allow the waveform to work with up to 4 Hz of Doppler spread. However, even with slow fading rates (e.g., 1 Hz) it is unlikely that the channel estimate remains constant for the entire 120 ms (Un+K symbol length), and thus when equalizing higher order modulations (i.e., 16-QAM, 64-QAM) there would be performance degradation due to the assumption that the channel estimate was constant for the entire 120 ms.

Performance can be improved by interpolating the channel estimate across the 120 ms frames. For example, 16 different channel estimates could be interpolated using channel estimates at both ends, so that there would be a new channel estimate every 16 Un symbols. Yet, an undesired side effect of interpolation is that all the original symmetry that existed in the $\overline{R}$ matrix is lost, necessitating the use of the Gaussian elimination technique to solve for the $\overline{L}$ and $\overline{U}$ decomposition matrixes, as noted above. Again, this loss of symmetry significantly increases the computational complexity of solving for x.

The above-noted approach implemented in the wireless communications device 20 advantageously allows for enhanced accuracy and bandwidth capability whether symmetry is present or not. The wireless communications device 20" advantageously implements a technique which may be used in conjunction with the above-noted approach or separately to provide desired Doppler spread capability while maintaining symmetry with respect to the above-noted equation 4. As such, Gaussian elimination may be avoided, and techniques such as Cholesky, Bareiss, Levinson and other LU factorization techniques may instead be utilized.

The wireless communications device 20" illustratively includes a wireless receiver 21" and associated antenna 22" for receiving wireless signals comprising alternating known and unknown symbol portions 31, 32, as discussed above. A demodulator 23" is connected to the wireless receiver 21". The demodulator 023" may be implemented in a systolic array architecture, as described above, although it need not be in all embodiments. By way of example, the demodulator 23" may be implemented in an FPGA, ASIC, DSP, etc., as will be appreciated by those skilled in the art.

The demodulator 23" illustratively includes a channel estimation module 24" for generating respective channel estimates for one or more prior unknown symbol portions 32 and a current unknown symbol portion based upon adjacent known symbol portions 31. That is, the channel estimation module 24" generates channel estimates for each successive unknown symbol portion 32, and the channel estimates for prior unknown symbol portions are used in determining the current unknown symbol portion, as will be discussed further below.

An autocorrelation module 25" generates autocorrelation matrices $\overline{R}$ for the prior and current unknown symbol portions 32 based upon respective channel estimates, and a channel match filter module 26" may be included for generating channel matching coefficients b (upper and lower) for the current unknown symbol portions. The demodulator 23" further illustratively includes a factorization module 27" for dividing the autocorrelation matrices $\overline{R}$ into respective upper and lower autocorrelation matrices $\overline{U}, \overline{L}$, and a transformation module 28" for transforming the channel matching coefficients b into upper and lower channel matching coefficients $b_u$, $b_l$, as discussed above (i.e., see equation (5)).

As the upper and lower autocorrelation matrices $\overline{U}, \overline{L}$, and upper and lower channel matching coefficients $b_u$, $b_l$ associated with each unknown symbol portion 32 are determined (where $b_u$, $b_l$ are generated using current and prior transformation coefficients $\overline{B}_u$ and $\overline{B}_l$, $\overline{U}$ and $\overline{L}$ are not only used by a back-substitution module 29" to determine the current unknown symbol portion, but they are also stored in a memory 69" for use in determining future unknown symbol portions. Also, the transformation coefficients $\overline{B}_u$ and $\overline{B}_l$ need to be stored in a memory. That is, the back-substitution module 29" determines the current unknown symbol portion 32 based upon a weighted average of the upper and lower autocorrelation matrices $\overline{U}, \overline{L}$, for the current and prior unknown symbol portions, and the upper and lower channel matching coefficients $b_u$, $b_l$, for the current unknown symbol portions (where the current b is transformed into the upper and lower channel matching coefficient $b_u$, $b_l$ by applying a weighted average of current and prior $\overline{B}_u$ and $\overline{B}_l$ transformation coefficient matrices). In other words, the demodulator 23" therefore advantageously uses channel estimates 33 based upon a constant channel to simplify the factorization and transformation calculations. Yet, by using the weighted average of the upper and lower autocorrelation matrix $\overline{U}, \overline{L}$ and the upper and lower transformation coefficient matrix $\overline{B}_u$ and $\overline{B}_l$ from the current and prior unknown symbol portions 32, the non-constant nature of the channel may still be accounted for so that desired accuracy may still be achieved.

By way of example, the upper and lower autocorrelation matrices $\overline{U}, \overline{L}$ and the upper and lower transformation coefficient matrices $\overline{B}_u$ and $\overline{B}_l$ for the current and prior unknown symbol portions 32 may be weighted based upon proximity of respective channel estimates 33 to unknown symbol portions, for example. A typical approach for interpolating is to use Wiener filters (see, e.g., Adaptive Filter Theory by Simon Haykin, Prentice Hall, 3rd edition, Dec. 27, 1995), or standard sample rate conversion interpolation. The proximity effect shows up because channel estimates that are closer to the desired interpolated channel estimate will be weighted more heavily than channel estimates that are farther away. How much weighting the farther away channel estimates get depends on whether the channel estimates are interpolating for a fading channel or a fixed channel. If the channel is not changing, a desirable interpolation scheme would be to average all channel estimates the same equally, but if the channel is changing quickly, the closest channel estimates are preferably weighted more heavily.

Additionally, each symbol in the current unknown symbol portion 32 may have one of a plurality of discrete values, and the back-substitution module may determine nearest discrete values (i.e., clamp to the nearest symbol value of the symbol alphabet such as 2-PSK, 4-PSK, etc.) for symbols within the current unknown symbol portion 32. In other words, the symbol estimates for the current unknown data portion 32 are clamped for use in the remainder of the BSA processing, while the unclamped values are stored in the memory 69" for use in future calculations such as soft decisions for FEC. As discussed above, the demodulator 23" may also include a signal energy removal module (not shown) for removing a known signal energy quantity associated with the known signal portions from the unknown symbol portions 32.

In some embodiments, the channel estimation module 24" may further generate a channel estimate for future unknown symbol portions in the same manner discussed above. As such, the autocorrelation module 25" may similarly generate an autocorrelation matrix $\overline{R}$ for the future unknown symbol portion(s), which are transformed into matrices $\overline{U}, \overline{L}$ as discussed above. In a similar fashion, the transformation module will determine the upper and lower transformation coefficient matrices $\overline{B}_u$ and $\overline{B}_l$ for the future portion and then create a weighted average of current/prior/future transformation coefficient matrices to transform b into upper and lower channel matching coefficients $b_u$ and $b_l$. Accordingly, the back-substitution module 29" may determine the current unknown symbol portion based upon the upper and lower autocorrelation matrices $\overline{U}, \overline{L}$ for the future unknown symbol portion(s), as well as those for the prior and current symbol portions.

In still other embodiments, the back-substitution module 29" may determine the current unknown symbol portion based upon the upper and lower autocorrelation matrices $\overline{U}, \overline{L}$ for the future unknown symbol portion(s) without using those for the prior symbol portion(s). It should be noted, however, that using future unknown/known symbol portions may require additional buffering and latency, so system requirements will drive whether future symbols can be used).

Figure 8:
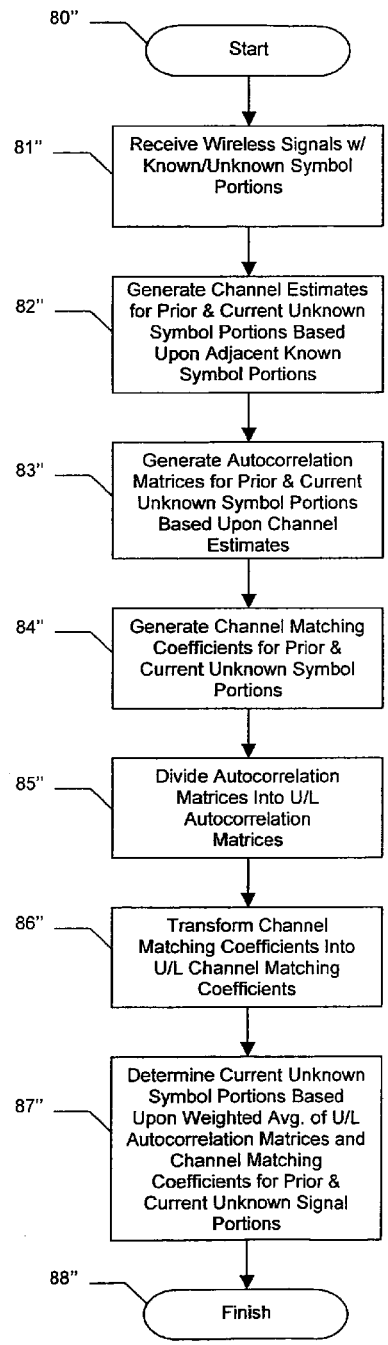
FIGS. 8 and 9 are flow diagrams illustrating the demodulation method steps performed by the wireless communications device of FIG. 7.

A wireless communications method aspect of the invention which may be performed by the wireless communications device 20'' is now described with reference to FIG. 8. Beginning at Block 80'', wireless signals comprising alternating known and unknown symbol portions 31, 32 are received, at Block 81'', and respective channel estimates 33 for one or more prior and/or future unknown symbol portions and a current unknown symbol portion are generated based upon adjacent known symbol portions, at Block 82'', as discussed above. Moreover, autocorrelation matrices $\overline{R}$ are generated for the prior and current unknown symbol portions 32 based upon respective channel estimates, at Block 83'', and respective channel matching coefficients b are generated (Block 84'') for the current unknown symbol portions.

The method may further include dividing the autocorrelation matrices $\overline{R}$ into respective upper and lower autocorrelation matrices $\overline{U}, \overline{L}$, at Block 85'', and computing the transformation coefficients $\overline{B}_u, \overline{B}_l$ which are used to transform b into upper and lower vectors $b_u, b_l$ prior to the BSA algorithm, at Block 86''. The current unknown symbol portion 32 is then determined based upon a weighted average of the upper and lower autocorrelation matrices $\overline{U}, \overline{L}$ for the current and prior unknown symbol portions and the upper and lower channel matching coefficients $b_u, b_l$ for the current unknown symbol portions, at Block 87'', as discussed above, thus concluding the illustrated method (Block 88'').

Figure 9:
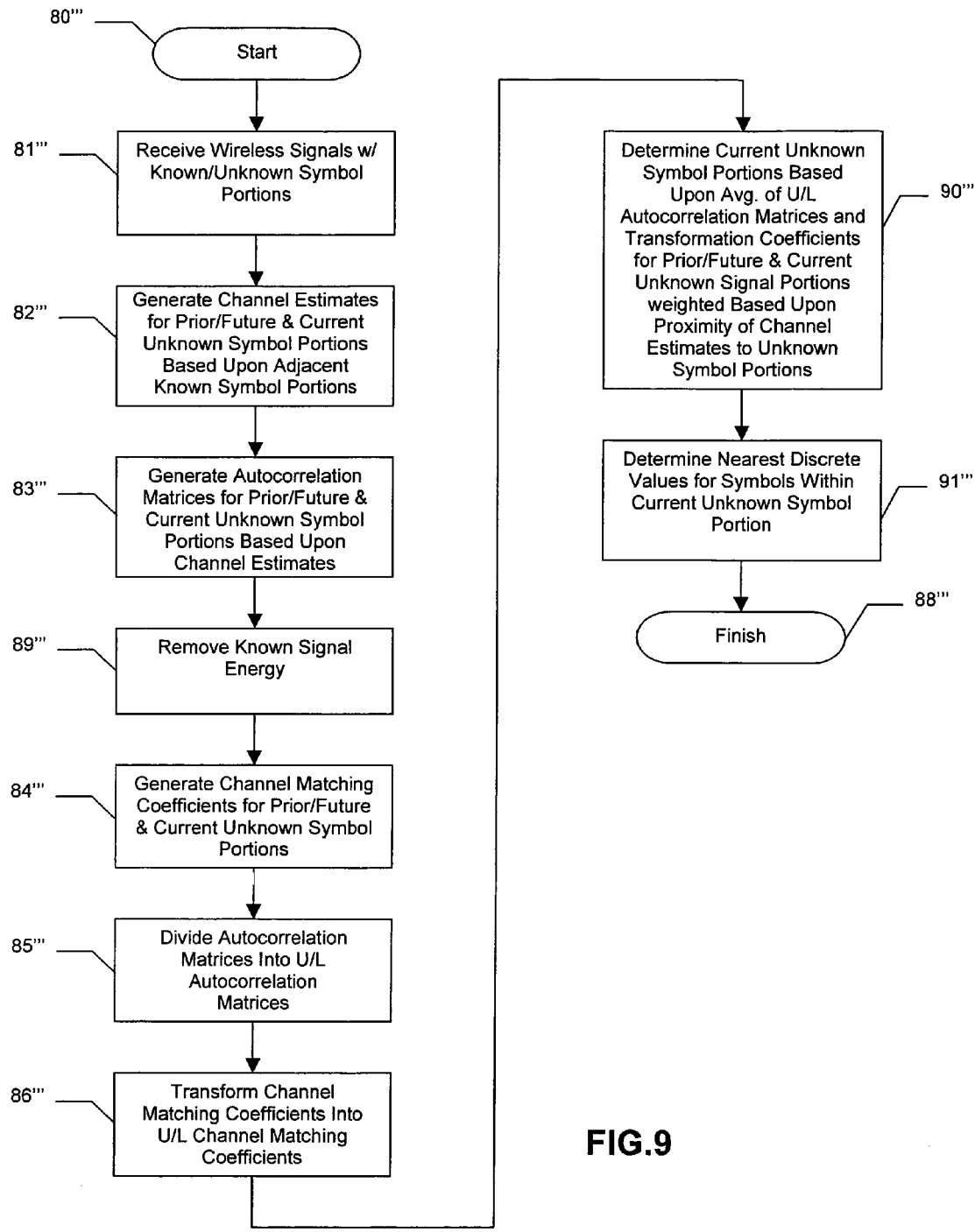

Further method aspects are now described with reference to FIG. 9. More particularly, a step of removing a known signal energy quantity from the unknown symbol portions 32 is performed prior to generating the channel matching coefficients 33, at Block 89''', as discussed above. Moreover, the determination of the current unknown symbol portion may include weighting the upper and lower autocorrelation matrices $\overline{U}, \overline{L}$ and the upper and lower transformation coefficient matrices $\overline{B}_u$ and $\overline{B}_l$ for the current and prior unknown symbol portions 32 (Block 90'''), based upon proximity of respective channel estimates to unknown symbol portions, as also noted above. Moreover, each symbol in the current unknown symbol portion 32 may be determined (i.e., clamped) to a nearest discrete value, at Block 91''', as further noted above. It should be noted that upper and lower autocorrelation matrices $\overline{U}, \overline{L}$ and the upper and lower transformation coefficient matrices $\overline{B}_u$ and $\overline{B}_l$ for future unknown symbol portions may also be used in addition to those for the prior unknown symbol portions, as illustrated at Blocks 82''', 83''', 84''', and 90''', as described above.

To provide further accuracy in certain applications, the particular BSA used in the application may be performed in forward and backward directions to compute two different estimates of the unknown symbols. The unknown symbol estimates are the actual values of the unknown symbols computed by BSA. This value is stored for use at the end but is clamped to the closest valid symbol constellation point to proceed with the BSA algorithm, as noted above. The forward and backward unknown symbol estimates may then be averaged for use in the next steps of the demodulation process, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
   a wireless receiver for receiving wireless signals comprising alternating known and unknown symbol portions over a channel; and
   a demodulator systolic array connected to said wireless receiver and comprising
      a channel estimation module for generating respective channel estimates for each unknown symbol portion based upon the known symbol portions,
      an autocorrelation module for generating autocorrelation matrices based upon the channel estimates,
      a channel match filter module for generating respective channel matching coefficients for the unknown symbol portions,
      a factorization module for dividing the autocorrelation matrices into respective upper and lower autocorrelation matrices,
      a transformation module for transforming the channel matching coefficients into upper and lower channel matching coefficients, and
      a back-substitution module for determining the unknown symbol portions by estimating the unknown symbol portions based upon respective upper autocorrelation matrices and upper channel matching coefficients, estimating the unknown symbol portions based upon respective lower autocorrelation matrices and lower channel matching coefficients, and combining respective estimates for each unknown symbol portion.

2. The wireless communications device of claim 1 wherein said back-substitution module averages the respective estimates for each unknown symbol portion.

3. The wireless communications device of claim 1 wherein said autocorrelation module generates the autocorrelation matrices based upon the channel estimates and a noise variance associated with the channel.

4. The wireless communications device of claim 1 wherein said demodulator systolic array further comprises a signal energy removal module for removing a known signal energy quantity from the unknown symbol portions.

5. The wireless communications device of claim 1 wherein said factorization module divides the autocorrelation matrices into respective upper and lower autocorrelation matrices based upon Gaussian elimination.

6. The wireless communications device of claim 1 wherein said factorization module divides the autocorrelation matrices into respective upper and lower autocorrelation matrices based upon Cholesky factorization.

7. The wireless communications device of claim 1 wherein said factorization module divides the autocorrelation matrices into respective upper and lower autocorrelation matrices based upon Bareiss factorization.

8. The wireless communications device of claim 1 wherein said factorization module divides the autocorrelation matrices into respective upper and lower autocorrelation matrices based upon Levinson factorization.

9. The wireless communications device of claim 1 wherein said factorization module divides the autocorrelation matrices into respective upper and lower autocorrelation matrices based upon Schur factorization.

10. The wireless communications device of claim 1 wherein said demodulator systolic array comprises a field-programmable gate array (FPGA).

11. The wireless communications device of claim 1 wherein said demodulator systolic array comprises an application specific integrated circuit (ASIC).

12. A wireless communications device comprising:
a wireless receiver for receiving wireless signals comprising alternating known and unknown symbol portions over a channel; and
a demodulator systolic array connected to said wireless receiver and comprising
a channel estimation module for generating respective channel estimates for each unknown symbol portion based upon the known symbol portions,
an autocorrelation module for generating autocorrelation matrices based upon the channel estimates,
a channel match filter module for generating respective channel matching coefficients for the unknown symbol portions,
signal energy removal module for removing a known signal energy quantity from the unknown symbol portions,
a factorization module for dividing the autocorrelation matrices into respective upper and lower autocorrelation matrices,
a transformation module for transforming the channel matching coefficients into upper and lower channel matching coefficients, and
a back-substitution module for determining the unknown symbol portions by estimating the unknown symbol portions based upon respective upper autocorrelation matrices and upper channel matching coefficients, estimating the unknown symbol portions based upon respective lower autocorrelation matrices and lower channel matching coefficients, and averaging respective estimates for each unknown symbol portion.

13. The wireless communications device of claim 12 wherein said autocorrelation module generates the autocorrelation matrices based upon the channel estimates and a noise variance associated with the channel.

14. The wireless communications device of claim 12 wherein said factorization module divides the autocorrelation matrices into respective upper and lower autocorrelation matrices based upon Gaussian elimination.

15. The wireless communications device of claim 12 wherein said factorization module divides the autocorrelation matrices into respective upper and lower autocorrelation matrices based upon Cholesky factorization.

16. The wireless communications device of claim 12 wherein said factorization module divides the autocorrelation matrices into respective upper and lower autocorrelation matrices based upon Bareiss factorization.

17. The wireless communications device of claim 12 wherein said factorization module divides the autocorrelation matrices into respective upper and lower autocorrelation matrices based upon Levinson factorization.

18. The wireless communications device of claim 12 wherein said factorization module divides the autocorrelation matrices into respective upper and lower autocorrelation matrices based upon Schur factorization.

19. The wireless communications device of claim 12 wherein said demodulator systolic array comprises a field-programmable gate array (FPGA).

20. The wireless communications device of claim 12 wherein said demodulator systolic array comprises an application specific integrated circuit (ASIC).

21. A wireless communications system comprising:
a plurality of wireless communications devices each comprising
a wireless transceiver for communicating wireless signals comprising alternating known and unknown symbol portions over a channel, and
a demodulator systolic array connected to said wireless transceiver for processing received wireless signals and comprising
a channel estimation module for generating respective channel estimates for each unknown symbol portion based upon the known symbol portions,
an autocorrelation module for generating autocorrelation matrices based upon the channel estimates,
a channel match filter module for generating respective channel matching coefficients for the unknown symbol portions,
a factorization module for dividing the autocorrelation matrices into respective upper and lower autocorrelation matrices,
a transformation module for transforming the channel matching coefficients into upper and lower channel matching coefficients, and
a back-substitution module for determining the unknown symbol portions by estimating the unknown symbol portions based upon respective upper autocorrelation matrices and upper channel matching coefficients, estimating the unknown symbol portions based upon respective lower autocorrelation matrices and lower channel matching coefficients, and combining respective estimates for each unknown symbol portion.

22. The wireless communications system of claim 21 wherein said back-substitution module averages the respective estimates for each unknown symbol portion.

23. The wireless communications system of claim 21 wherein said autocorrelation module generates the autocorrelation matrices based upon the channel estimates and a noise variance associated with the channel.

24. The wireless communications system of claim 21 wherein said demodulator systolic array further comprises a signal energy removal module for removing a known signal energy quantity from the unknown symbol portions.

25. The wireless communications system of claim 21 wherein said demodulator systolic array comprises a field-programmable gate array (FPGA).

26. The wireless communications system of claim 21 wherein said demodulator systolic array comprises an application specific integrated circuit (ASIC).

27. A wireless communications method comprising:
receiving wireless signals comprising alternating known and unknown symbol portions over a channel;
generating respective channel estimates for each unknown symbol portion based upon the known symbol portions;
generating autocorrelation matrices based upon the channel estimates;
generating respective channel matching coefficients for the unknown symbol portions;
dividing the autocorrelation matrices into respective upper and lower autocorrelation matrices;
transforming the channel matching coefficients into upper and lower channel matching coefficients; and
determining the unknown symbol portions by estimating the unknown symbol portions based upon respective upper autocorrelation matrices and upper channel matching coefficients, estimating the unknown symbol portions based upon respective lower autocorrelation matrices and lower channel matching coefficients, and combining respective estimates for each unknown symbol portion.

28. The method of claim 27 wherein combining comprises averaging the respective estimates for each unknown symbol portion.

29. The method of claim 27 wherein generating the autocorrelation matrices comprises generating the autocorrelation matrices based upon the channel estimates and a noise variance associated with the channel.

30. The method of claim 27 further comprising removing a known signal energy quantity from the received signals prior to generating the channel matching coefficients.

* * * * *